Patented Jan. 1, 1952

2,580,714

UNITED STATES PATENT OFFICE 2,580,714

PRODUCTION OF BETA-HYDROXY CARBOXYLIC ACID LACTONES FROM KETENE AND ALDEHYDE WITH CLAY CATALYST

Frank G. Young and John T. Fitzpatrick, Charleston, W. Va., assignors, by mesne assignments, to Union Carbide and Carbon Corporation, a corporation of New York No Drawing. Application May 24, 1949, Serial No. 95,166

10 Claims. (Cl. 260—344)

This invention relates to the production of beta-hydroxy carboxylic acid lactones, and more especially it concerns a novel process for the production of such lactones from a ketene and certain saturated aldehydes in the presence of the class of heterogeneous catalysts hereinafter described, having a hydrous aluminum silicate structure.

Processes already are known for the production of beta-hydroxy acid lactones by reacting ketene and saturated aliphatic aldehydes and ketones at temperatures below 25° C. in the presence of Friedel-Crafts type catalysts such as the halides of boron, zinc, aluminum, tin and iron. In such processes it is necessary to neutralize the catalyst or remove it from the reaction mixture before processing the latter to recover the lactone, since the catalyst, if allowed to remain during the lactone isolation procedure, causes decomposition or polymerization of the lactone with attendant loss of process efficiency. Such catalysts are difficult to remove from the reaction mixture.

Another recent process for the production of beta-hydroxy acid lactones involves the use of an activated alumina or an especially prepared alumina-silica catalyst. These catalysts require careful and tedious preparation. The catalyst must be completely freed from certain impurities such as alkali metals, by extensive leaching with acid solutions followed by leaching with acid-salt solutions under carefully controlled conditions, otherwise a profound adverse effect upon the activity and efficacy of the catalyst is produced. The use of especially purified reagents and of a time-consuming method of preparation subject to strict technical control leads to an expensive catalyst not readily available.

The present invention is based in part upon the discovery that ketene can be condensed with saturated aliphatic aldehydes containing not more than six carbon atoms in the presence of certain hydrous aluminum silicates, and inorganic materials having essentially a hydrous aluminum silicate structure, as hereinafter more fully described, to provide good yields of beta-hydroxy carboxylic acid lactones of the type

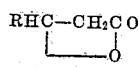

wherein R represents hydrogen or an alkyl group containing one to five carbon atoms.

We now have found that many naturally occurring clays are remarkably active as catalysts for such process. This is surprising since the clays contain substantial amounts of alkali metals, impurities that adversely affect the activity of the previous catalysts. The clays are suitable for use after simple drying or by at most a simple treatment with an aqueous mineral acid and drying at moderate temperatures around 200° C. rather than calcining at 950° C.–1400° C. as practiced in preparing prior alumina-containing catalysts. The clays are both mined and acid-activated commercially on a large scale for use as filter-aids, decolorizing agents, thickeners, absorbents, and high-temperature gas phase catalysts, such as the cracking catalysts used in the petroleum industry. It is surprising to find them extremely active in a liquid phase low temperature reaction such as the present process.

These clays used as catalysts in the present process produce beta-lactones in as good or better efficiency than any previously described catalyst. The former are much cheaper initially, and their activity diminishes only slowly with use. They are readily available commercially, and no expensive, strict technical control is necessary in their preparation or use as catalysts. A great economic advantage occurs from their use especially on a commercial scale, since the catalyst recovery and removal processes are simple or may be eliminated because the clays are so cheap as to be expendable. This simplifies both the process and the equipment required, and improves the economy of beta-lactone production.

In accordance with the invention, a ketene, such as ketene per se or an alkyl-substituted ketene such as monomethyl, ethyl or propyl ketene or dimethyl, ethyl or propyl ketene is reacted with a saturated aliphatic aldehyde having from one to six carbon atoms and containing only carbon and hydrogen in the molecule in addition to the aldehyde group, in the presence as catalyst of a hydrous aluminum silicate or of a clay mineral having essentially a hydrous aluminum silicate structure, such as the natural clays, and similar clays that have been activated by treatment with a mineral acid such as dilute sulfuric acid or hydrochloric acid—e. g.—a 10% aqueous solution of sulfuric acid, with subsequent removal of excess acid with water, under conditions commonly used in producing acid-activated natural clays.

The class of active catalysts of the invention may best be characterized as clay minerals having essentially a hydrous aluminum silicate structure, with or without the isomorphous substitution of other atoms such as those of sodium, potassium, calcium, magnesium or iron, for part of the aluminum and silicon ions of the crystal lattice (as shown by chemical analysis, electron diffraction, and a study of the ion-exchange properties). Such catalysts may have been activated by a mineral acid treatment as herein indicated.

Among suitable heterogeneous catalysts useful in the process are fuller's earths of the halloysitic, montmorillonitic and attapulgitic classifications, including among others, the montmorillonite, beidellite, nontronite, kaolinite, nacrite, dickite and metahalloysite types. The several different hydrous aluminum silicate structures are effective catalysts though with different degrees of reactivity. The activity of each of these types of catalysts is improved by treatment of the clay with a mineral acid. Chemically pure hydrous aluminum silicate, $Al_2O_3 \cdot 2SiO_2 \cdot 2H_2O$, also is an active catalyst. Thus, the cations adsorbed on all clays are not necessary to impart these clays chemical activity for this type of reaction.

All clays contain water, part of which is adsorbed and part of which is actually involved in the crystal lattice. It is preferred to remove substantially all of the adsorbed or physically bound water since otherwise it reacts with portions of the ketene and aldehyde and lowers the catalytic efficiency of the clay. This adsorbed water preferably is removed from the clay by roasting the latter at approximately 200° C., or by azeotropic distillation with xylene or other inert volatile liquid forming heterogeneous constant boiling mixtures with water. The chemically bound water of the hydrous aluminum silicates must be retained since otherwise a rupture of the lattice structure occurs with a loss of catalytic activity. Thus the catalysts of this invention further differ from highly purified alumina-silica catalysts in generally containing substantial amounts of alkali metals not adversely affecting their efficacy. Calcination at 950° C.–1400° C. for several hours as commonly used in the preparation of pure alumina-silica catalysts, greatly decreases the activity of the catalysts of this invention.

Those hydrous aluminum silicates that have been activated by a treatment with a dilute mineral acid generally are more active catalysts in the process than are the untreated natural materials excepting in the case of the reactions involving formaldehyde where little difference is found between the results secured with activated and unactivated hydrous aluminum silicates. By the activation of the natural or raw clays or hydrous aluminum silicates with a dilute mineral acid it is believed that part or all of the more loosely bound cations on the surface of the crystal lattice are replaced by hydrogen ions, without changing the basic lattice structure.

The amount of the catalyst employed may vary between rather wide limits but in general ranges between around 4% and 40% by weight, based upon the total weight of the ketene and aldehyde used. However, amounts of the catalyst in excess of 40% have no apparent deleterious effect. With the more active clays, such as the activated montmorillonites, the smaller amounts of the catalyst can be used, depending upon the reaction rate desired.

The catalysts of this invention appear to have their utility largely confined to the reaction of the lower saturated aliphatic aldehydes. Those aldehydes containing more than six carbon atoms provide low yields of beta-lactones together with complex mixtures of other products. The reactions of saturated ketones with a ketene to produce beta-lactones are not effectively catalyzed by the use of the catalysts of this invention under conditions at which the lower saturated aldehydes provide good yields of beta-lactones.

It is preferred to conduct the reaction between ketene and the aldehyde in the presence of an inert organic solvent for the reactants; and in the case of the ketene-formaldehyde reaction the use of such an inert solvent is essential. By the use of the solvent, the ketene and aldehyde can be introduced concurrently in equimolar ratio to a suspension of the catalyst in the inert solvent, or can be premixed and the mixture added to such suspension. For best results introduction of the reactants in substantially equimolar ratio is necessary since substantial departure from this ratio results in self-condensation of the aldehyde (to paraformaldehyde, paraldehyde, etc.) and, since these polymers are not reactive towards ketene, the efficiency of the desired reaction is reduced. An excess of ketene does not appear to interfere with the reaction producing the beta-lactone.

Among suitable inert solvents are the aliphatic ethers having two to eight carbon atoms, such as methyl ether, ethyl ether, isopropyl ether and dioxane; inert chlorinated solvents such as chloroform, carbon tetrachloride, chlorobenzene, ethylene dichloride and trichloroethane; and the benzene hydrocarbons such as benzene, toluene and the xylenes. The beta-lactone products also are suitable as solvents in the process.

The reaction of the ketene and saturated aldehyde preferably is conducted at temperatures around −10° C. to +10° C., but temperatures of 10° C. or below are not critical when using these catalysts, and temperatures as high as 100° C. may be used, while temperatures as low as −50° C. are practicable at decreased reaction rates. At temperatures around 50° C. the yields of beta-lactones are materially reduced, but yields of around 17% have been secured at 100° C.

After the reaction between the ketene and aldehyde has progressed to the desired stage, the catalyst is readily removed by settling and decantation of the supernatant liquid, by filtration, or by the preferential wetting of the catalyst with water and decantation of the resultant slurry from the layer of beta-lactone solution. After separation of the catalyst, recovery of the beta-lactone generally is achieved by vacuum distillation. The beta-lactone also can be isolated from the catalyst-free reaction mixtures by other low temperature procedures such as by crystallization.

The reaction of the ketene and aldehyde can be conducted in a continuous manner by feeding a slurry of the heterogeneous catalyst in an inert solvent and approximately equimolar proportions of ketene and aldehyde into a closed, externally-cooled kettle surmounted by a reactor column filled with Raschig rings. The unreacted ketene passes up through the column where it reacts with a countercurrent stream of the said slurry containing unreacted aldehyde flowing downward in the column and which is recycled to the top in suitable manner. A portion of the reaction mixture is withdrawn from this system, either intermittently or continuously, in amount generally corresponding to the amount of slurry and reactants being fed thereto.

The following examples serve to illustrate the invention. In the examples all parts are given in terms of weight unless otherwise indicated.

Example 1

Into a suspension in about 360 parts of ethyl ether of 120 parts of a dry natural fuller's earth or clay containing mineral attapulgite, a hydrous magnesium aluminum silicate, there was introduced during 1 hour, a mixture of 69 parts of anhydrous gaseous formaldehyde and 126 parts of ketene while maintaining the reaction mixture at around 10° C. The reaction mixture then was filtered to remove the catalyst and solids, and the filtrate was fractionally distilled under vacuum, yielding 92 parts of pure beta-propiolactone which were separately recovered. The solids separated by the filtration contained 28 parts of paraformaldehyde mixed with the catalyst. Such mixture can be used as the catalyst in a subsequent run, with or without removal of the paraformaldehyde.

The yield of beta-propiolactone was 63% based upon the formaldehyde charged, at an efficiency of 93.5% based upon the formaldehyde consumed in the process.

Example 2

During 1 hour, a mixture of 85 parts of anhydrous gaseous formaldehyde and 126 parts of ketene was fed into an agitated suspension in 357 parts of dry ethyl ether of 120 parts of a dry commercially available mineral acid-activated montmorillonite clay while maintaining the resultant mixture at 10° C. The absorption of the ketene and aldehyde was substantially complete. The reaction mixture then was filtered to remove the catalyst, and the filtrate was fractionally distilled under vacuum, yielding 109 parts of beta-propiolactone, boiling at 47° C.–48° C. under a pressure of 10 mm. of mercury.

The solid material removed by the aforesaid filtration had increased in weight from 120 parts to 155 parts due to the presence of solid paraformaldehyde resulting from polymerization of formaldehyde.

Taking account of the paraformaldehyde recovered, a 53.4% yield of the beta-lactone was secured at an efficiency of 90.8%, based upon the aldehyde.

Example 3

Into a suspension in 180 parts of ethyl ether of about 155 parts of the solid clay-paraformaldehyde mixture containing 120 parts of clay and 35 parts of paraformaldehyde, and obtained by filtration of the reaction mixture produced in Example 1, was fed during 2 hours a mixture of 114 parts (3.8 moles) of dry gaseous formaldehyde and 252 parts (6.0 moles) of ketene while maintaining the reaction mixture at 10° C. The reaction mixture then was filtered and the filtrate processed in the manner described in Example 1, providing 174 parts of pure beta-propiolactone, corresponding to a yield of 64%, based upon the formaldehyde charged.

Example 4

Into a stirred suspension of 100 parts of an activated mineral acid-treated montmorillonite clay in 725 parts of dry ethyl ether, 102 parts (2.43 moles) of gaseous ketene and 174 parts (2.42 moles) of dry n-butyraldehyde were fed over a period of 40 minutes while maintaining the reaction mixture at about 0° C. The ketene was absorbed completely. The reaction mixture was filtered to remove the catalyst, and the filtrate was fractionally distilled under vacuum, yielding 160 parts of beta-caprolactone as a liquid boiling at 62° C.–63° C. under 5 mm. of mercury pressure; specific gravity 30° C./15.6° C. 0.977; refractive index 1.4203 at 30° C.; molecular refraction, 29.01 observed; 29.36 calculated. This corresponds to a yield of 58%, based upon the reactants charged. The beta-caprolactone was further identified by its conversion to beta-hydroxycaproanilide—a white crystalline solid melting at 145.5° C.–147° C., and having an elementary analysis of

|  | C | H | N | Hydroxyl |
|---|---|---|---|---|
|  | Per cent | Per cent | Per cent | Per cent |
| Found | 69.5 | 8.5 | 6.7 | 8.8 |
| Calculated for $C_{12}H_{17}O_2N$ | 69.6 | 8.3 | 6.8 | 8.2 |

Example 5

Following the procedure described in Example 4 but substituting 106 parts (2.42 moles) of acetaldehyde for the butyraldehyde, the filtrate from the resultant reaction mixture yielded upon fractional distillation under vacuum, 131 parts of beta-butyrolactone, boiling at 86° C.–87° C. at a pressure of 50 mm. of mercury; specific gravity 30° C./15.6° C. 1.044; refractive index at 30° C. 1.4062; molecular refraction, observed 20.23; calculated 20.13.

The yield of the lactone was 63%, based upon the acetaldehyde. The lactone was further identified by treatment with excess aqueous ammonium hydroxide solution at below 50° C. and evaporation of the solution whereupon white crystalline beta-hydroxybutyramide melting at 83.7° C.–84.5° C. was obtained.

Example 6

Following the procedure described in Example 4 but substituting as the catalyst 100 parts of dry attapulgus fuller's earth (containing natural attapulgite), the filtrate from the resultant reaction mixture yielded, upon fractional distillation under vacuum, 69 parts of beta-caprolactone.

Example 7

Following the procedure described in Example 5 but substituting as the catalyst 100 parts of a dry, naturally occurring montmorillonite clay, the filtrate from the ketene-aldehyde reaction mixture yielded, upon fractional distillation under vacuum, 78 parts of beta-butyrolactone corresponding to a yield of 37.5%, based upon the acetaldehyde.

Example 8

Into a stirred suspension of 10 parts of an acid-treated clay of the montmorillonite type in 104 parts of dioxane there were introduced simultaneously during 2 hours, 132 parts of acetaldehyde at the rate of 66 parts per hour and 126 parts of ketene at the rate of 63 parts per hour, while maintaining the temperature at 100° C. by heating. Reaction was incomplete as shown by blow-off of ketene from the reactor. Distillation of the filtrate from the reaction mixture gave 100 parts of unreacted acetaldehyde and 43 parts of beta-butyrolactone. The yield was 16.6% based on the acetaldehyde charged, with an efficiency of 69% based upon the acetaldehyde consumed.

Example 9

Into a stirred suspension of 10 parts of an acid-activated montmorillonite clay in 300 parts of mineral oil inert to the reactants and maintained at 50° C. there was added a mixture of 61 parts of gaseous formaldehyde and 126 parts of gaseous ketene over a period of 3 hours. The mineral oil is being marketed under the trade name "Marcol JX, viscosity 85-85". Reaction was incomplete since some ketene gas passed through the reaction mixture, and 25 parts of paraformaldehyde were recovered together with the clay catalyst by filtration of the reaction mixture. Distillation of the filtrate under reduced pressure gave 38 parts of beta-propiolactone, a yield of 26% based on the formaldehyde charged and an efficiency of 44% based on the formaldehyde consumed.

The lactones made by the process are useful in the production of other compounds and as solvents.

The present process has the important advantages over other processes using strongly acidic homogeneous catalysts that these heterogeneous catalysts are insoluble in the ketene-aldehyde reaction mixture and are readily removed from the reaction mixture by simple filtration, settling and decantation, or the equivalent. The process requires no neutralization procedure conducted at low temperatures as in the case where acidic homogeneous catalysts are used. The Friedel-Crafts type of catalyst is difficult to remove from the reaction mixture and, if allowed to remain therein during the isolation procedure, causes decomposition or polymerization of the beta-lactones with attendant loss of efficiency of the process. Moreover, these clay-type catalysts have the outstanding advantages of being readily available, relatively inexpensive, and readily reusable in the process. Thus, the overall catalyst cost is substantially reduced, even where relatively large amounts of the catalysts are used.

The term "substantially dry" is used in the claims to designate hydrous clays and other hydrous aluminum silicate structures of the kind herein disclosed which are substantially free from absorbed moisture.

The invention is susceptible of modification within the scope of the appended claims.

We claim:

1. Process for producing monomeric beta-hydroxy carboxylic acid lactones, which comprises reacting a ketene with a saturated aliphatic monoaldehyde having from one to six carbon atoms and having only carbon and hydrogen in the molecule in addition to the aldehyde group, in the presence of an inert solvent for the reactants and of a clay mineral having essentially a hydrous aluminum silicate.

2. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, in the presence of an inert solvent for the reactants and of a substantially dry hydrous natural clay.

3. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, in the presence of an inert solvent for the reactants and of a dry mineral material having essentially a hydrous aluminum silicate structure.

4. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, in the presence of an inert solvent for the reactants and of a clay possessing a hydrous aluminum silicate structure and containing in the crystal lattice at least one atom of the class consisting of sodium, potassium, calcium, magnesium and iron.

5. Process for producing monomeric beta-hydroxy carboxylic acid lactones, which comprises reacting ketene with a saturated aliphatic unsubstituted monoaldehyde having up to six carbon atoms in the molecule, in the presence of an inert solvent for the reactants and of a clay possessing a hydrous aluminum silicate structure in which a portion of either or both the aluminum and silicon atoms has been replaced by corresponding atoms of at least one member of the class consisting of sodium, potassium, calcium, magnesium and iron.

6. Process as defined in claim 5 wherein the said clay has been activated by treatment with a dilute mineral acid.

7. Process for producing monomeric beta-hydroxy carboxylic acid lactones, which comprises reacting ketene with a saturated aliphatic unsubstituted monoaldehyde having from two to six carbon atoms in the molecule, in the presence of a substantially dry hydrous natural clay.

8. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, at a temperature within the range between $-50°$ C. and $+100°$ C. in the presence of an inert solvent for the reactants and of a substantially dry hydrous natural clay having a hydrous aluminum silicate structure.

9. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, at a temperature within the range between $-50°$ C. and $+100°$ C. in the presence of an inert solvent for the reactants and of an acid-activated clay having essentially a hydrous aluminum silicate.

10. Process for producing monomeric beta-hydroxy carboxylic acid lactones, which comprises reacting ketene with a saturated aliphatic monoaldehyde having from one to six carbon atoms and having only carbon and hydrogen in the molecule in addition to the aldehyde group, at a temperature within the range between $-50°$ C. and $+100°$ C. in the presence of an inert solvent for the reactants and of a substantially dry acid-activated hydrous natural clay.

FRANK G. YOUNG.
JOHN T. FITZPATRICK.

REFERENCES CITED

The following references are of record in the file of this patent:

UNITED STATES PATENTS

| Number | Name | Date |
|---|---|---|
| 2,229,353 | Thomas | Jan. 21, 1941 |
| 2,282,922 | Ahlberg | May 12, 1942 |
| 2,462,357 | Caldwell | Feb. 22, 1949 |